(12) United States Patent
Itoi

(10) Patent No.: US 8,006,732 B2
(45) Date of Patent: Aug. 30, 2011

(54) PNEUMATIC TIRE WITH SIDEWALL DECORATIVE BAND

(75) Inventor: Daita Itoi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1019 days.

(21) Appl. No.: 11/886,296

(22) PCT Filed: Feb. 14, 2006

(86) PCT No.: PCT/JP2006/302520
§ 371 (c)(1),
(2), (4) Date: Sep. 14, 2007

(87) PCT Pub. No.: WO2006/098107
PCT Pub. Date: Sep. 21, 2006

(65) Prior Publication Data
US 2009/0008015 A1    Jan. 8, 2009

(30) Foreign Application Priority Data
Mar. 16, 2005   (JP) ................................. 2005-075337

(51) Int. Cl.
*B60C 13/02* (2006.01)
*B60C 13/00* (2006.01)
(52) U.S. Cl. ........................................ 152/523; 152/524
(58) Field of Classification Search .................. 152/523, 152/524
See application file for complete search history.

(56) References Cited

U.S. PATENT DOCUMENTS

| | | | |
|---|---|---|---|
| 4,198,774 A * | 4/1980 | Roberts et al. ................ | 152/523 |
| 5,645,661 A | 7/1997 | Clementz et al. | |
| 6,253,815 B1 | 7/2001 | Kemp et al. | |
| 6,612,352 B1 * | 9/2003 | Barrese et al. ................ | 152/523 |

FOREIGN PATENT DOCUMENTS

| | | |
|---|---|---|
| JP | 8-282215 A | 10/1996 |
| JP | 10-193922 A | 7/1998 |
| JP | 10-193923 A | 7/1998 |
| JP | 11-20416 A | 1/1999 |
| JP | 2000-513290 A | 10/2000 |
| JP | 2002-522294 A | 7/2002 |
| JP | 2002-307914 A | 10/2002 |

OTHER PUBLICATIONS

English machine translation of JP 10-193922 A, Jul. 28, 1998.*

* cited by examiner

*Primary Examiner* — Adrienne C Johnstone
(74) *Attorney, Agent, or Firm* — Sughrue Mion, PLLC

(57) ABSTRACT

A tire 10 has an endless decorative band 2 on a surface of a sidewall 1. The decorative band 2 has one or more first indicative sector 3 and one or more second indicative sector 4 which are arranged alternately and consecutively in the circumferential direction. The first indicative sector 3 consists of a background portion 5 which continuously leads to the sidewall portion 1 adjacent to the first indicative sector with a uniform surface roughness value, and a foreground portion 6 which is arranged in the background portion 5 and forms marks by having a surface roughness value larger than that of the background portion 5. A background portion 7 constituting a part or whole of the second indicative sector 4 has a surface rougher than any of the sidewall portion 1 and the background portion 5 of the first indicative sector 3.

10 Claims, 9 Drawing Sheets

FIG. 1 PRIOR ART
(a)
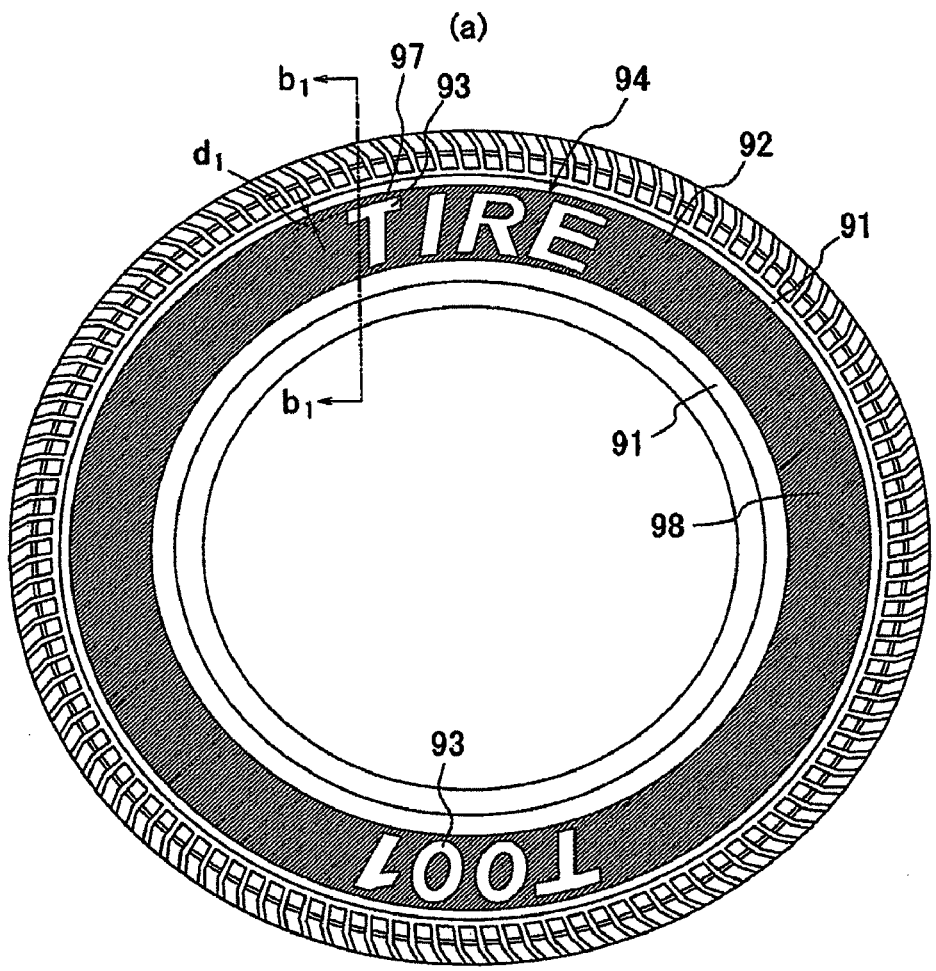
PRIOR ART
(b)
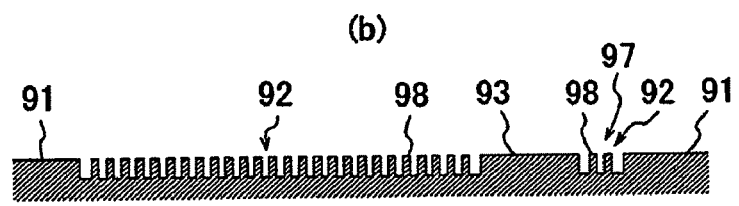
Section $b_1 - b_1$

FIG. 3
(a) PRIOR ART
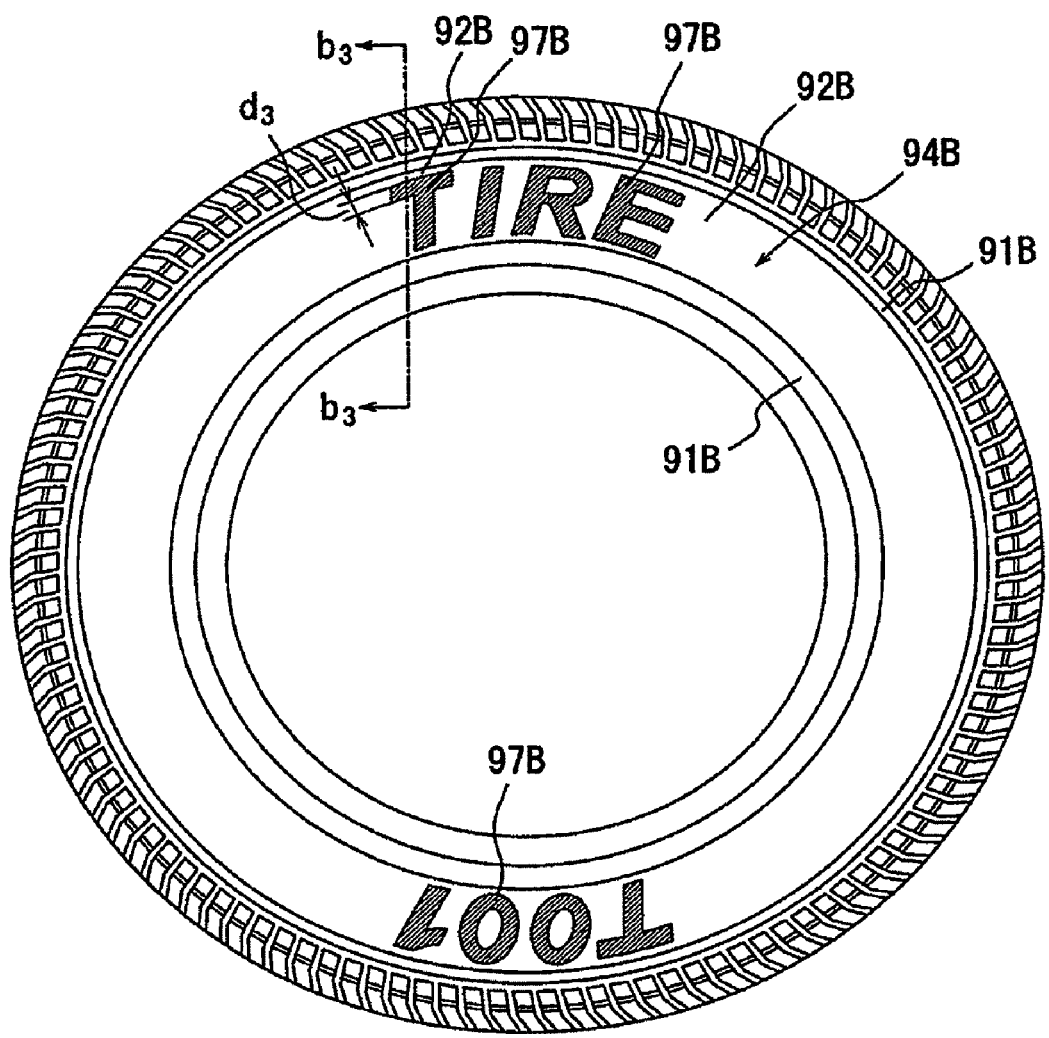
(b) PRIOR ART
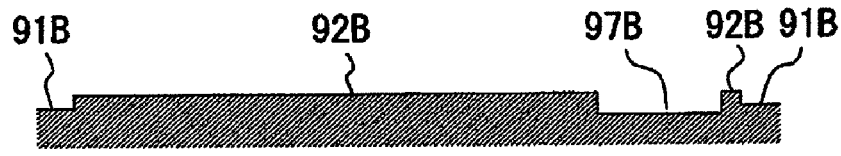
Section $b_3 - b_3$

FIG. 5
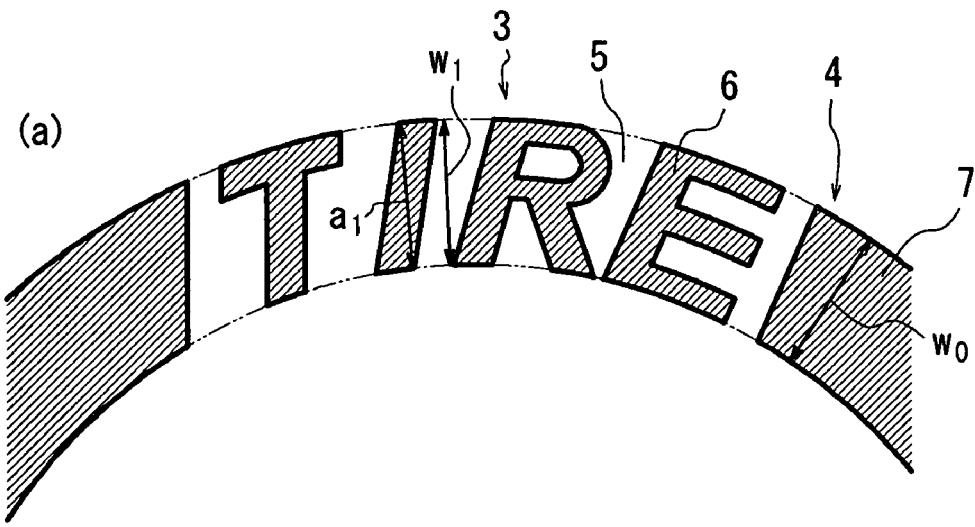
(a)
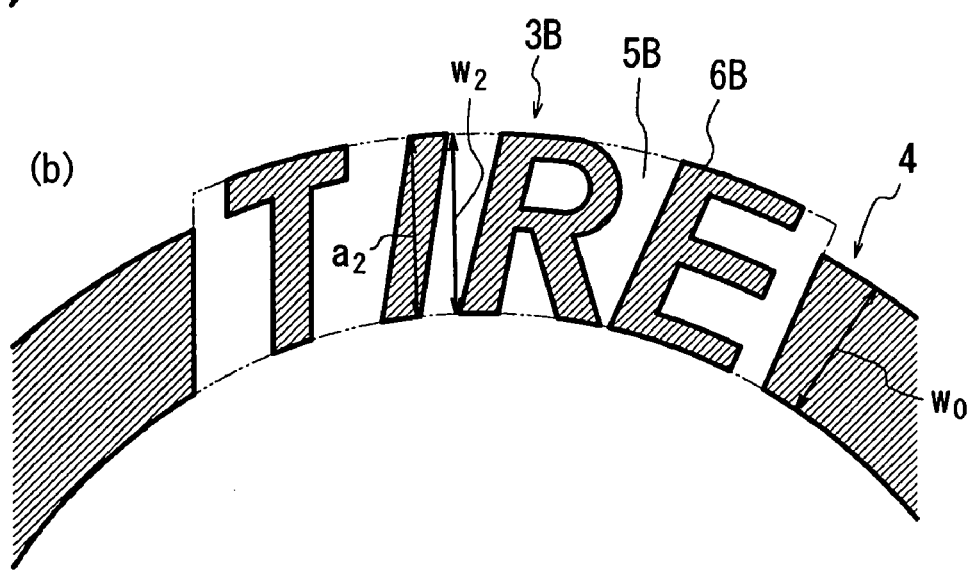
(b)
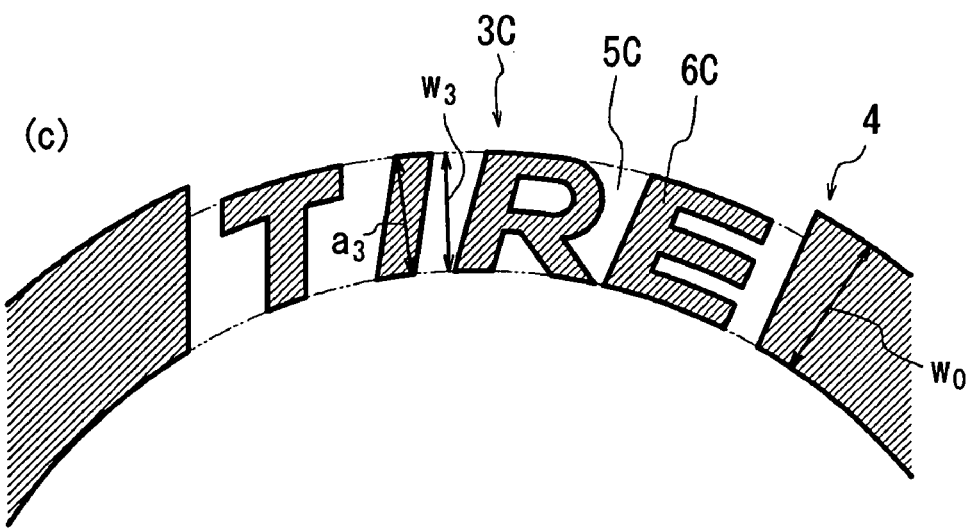
(c)

FIG. 6
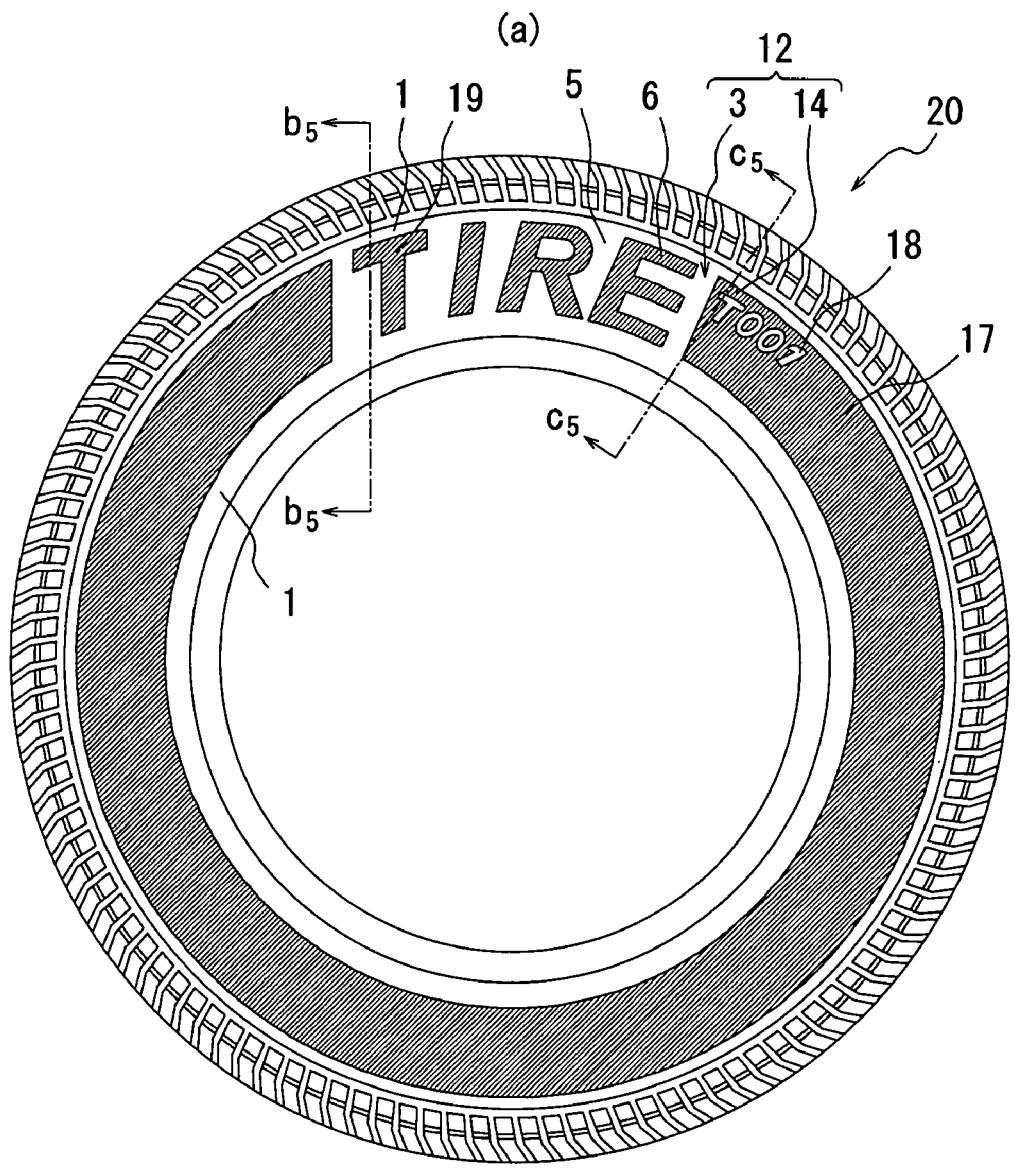
(a)
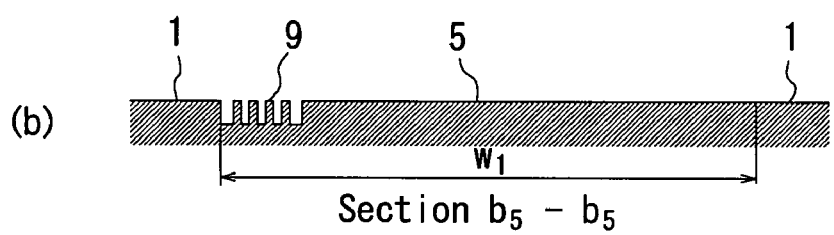
(b) Section $b_5 - b_5$
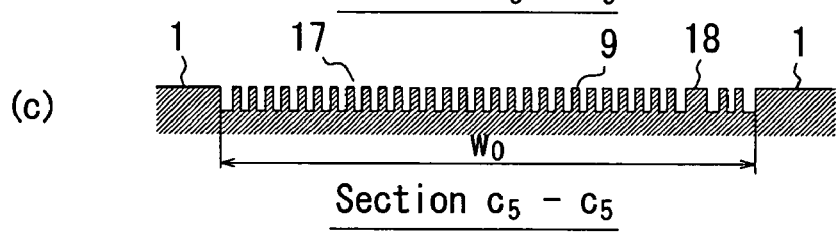
(c) Section $c_5 - c_5$

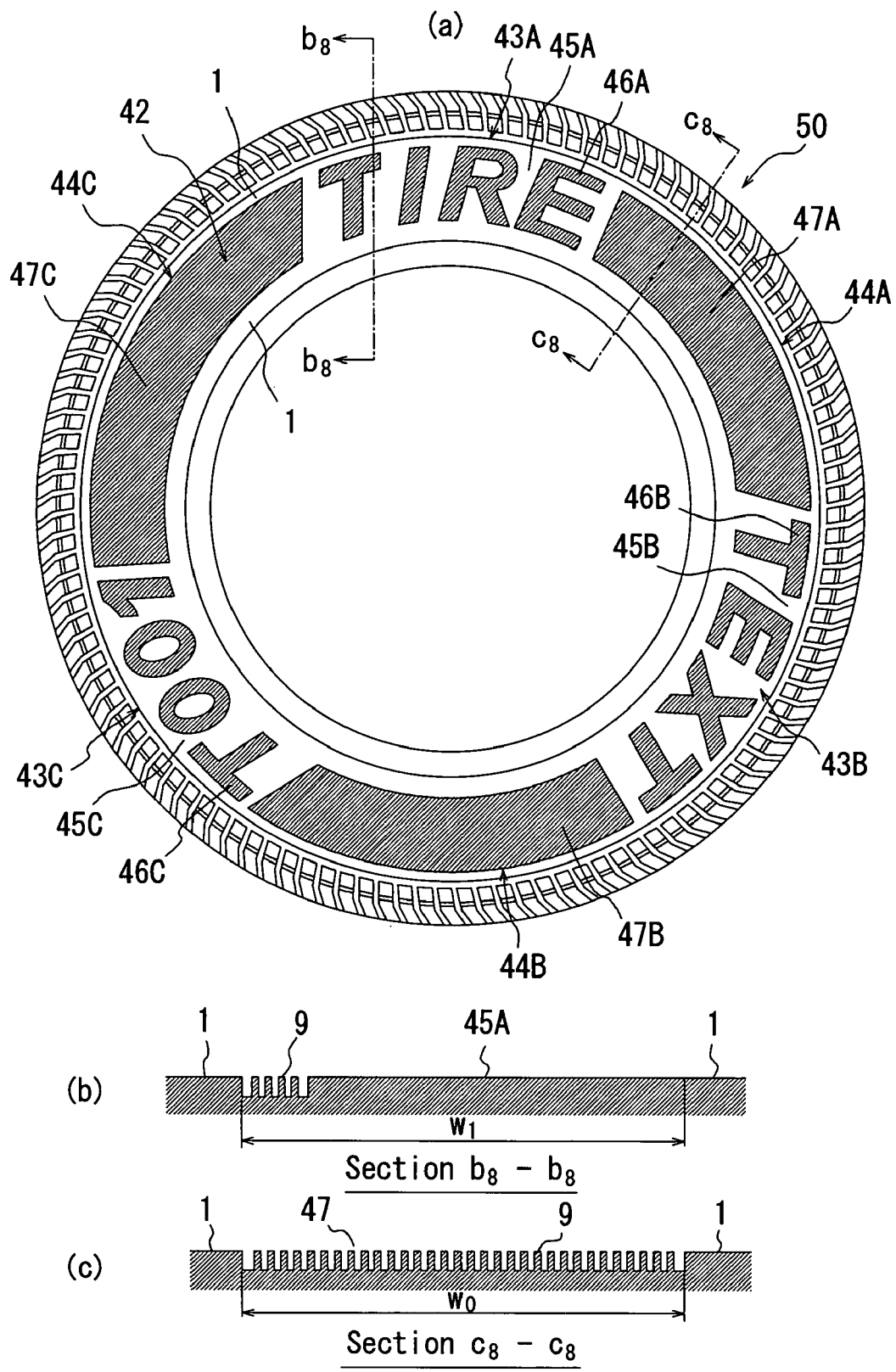

PNEUMATIC TIRE WITH SIDEWALL DECORATIVE BAND

TECHNICAL FIELD

The present invention relates to a tire provided with a decorative band on a surface of at least one of paired sidewalls and marks formed on the decorative band. More particularly, the present invention is directed to improve a visibility of the marks as well as to prevent a loss of an operating life of the tire caused by the formation of the marks.

RELATED ART

In order to indicate trademarks, trade dresses and the like of the tire, there has been practiced forming marks consisting of characters, symbols or graphics on the sidewall of the tire. The below-mentioned tire is an example of tire which is aimed to make the marks distinguishable (see Patent Document 1).

FIG. 1(a) is a side view showing such a conventional tire, and FIG. 1(b) is a sectional view as viewed along arrow $b_1$ in FIG. 1(a). In this tire, an endless decorative band 94 having a background portion 92 in which a number of ridges are aligned in the circumferential direction to form a rough surface is formed on a surface of a sidewall 91. A foreground portion 93 having surface roughness different from that of the background portion 92 is provided in the background portion 92. With the difference in the surface roughness of these portions, the marks become visible.

FIG. 2(a) is a side view showing another example of such tire, and FIG. 2(b) is a sectional view as viewed along arrow $b_2$ in FIG. 2(a). The tire shown in these figures is configured such that an endless decorative band 94A is formed on a surface of a sidewall 91A as well, a background portion 92A of ridges 98A is arranged on a circumferential part of a part of the decorative band, and a foreground portion 93A having surface roughness different from that of the background portion 92A is provided in the background portion 92A to form the marks.

Another means for making the marks distinguishable is shown in FIGS. 3(a) and 3(b) which are a side view of the tire and a sectional view as viewed along arrow $b_3$, respectively. In this tire, an endless decorative band 94B is provided on a surface of a sidewall 91B, and a convex portion projecting from the surroundings, which is served as a background portion, is formed on a part or whole of the decorative band. A foreground portion 93B which is recessed from the surface of the sidewall 91B is provided in the background portion 92B. In this way, the tire is configured to indicate the marks by forming bumps between these portions.

Patent Document 1: Japanese Patent Application Laid-open No. H10-193922 (JP 10193922 A)

DISCLOSURE OF THE INVENTION

Problems to be Solved by the Invention

In the tire shown in FIG. 1, however, when the foreground portion 93 is extended to the edge of the background portion 92 or its neighbors in order to enlarge the marks, stress may be likely to concentrate at a narrow width concave portion 97 with a width d1 which is between the edges of the foreground and background portions to occur a crack or cracks therefrom. Therefore, the foreground portion cannot be large enough to be distinguishable. This problem is applicable to the tire shown in FIG. 2 and it is thus necessary to prevent the stress from concentrating at a narrow width concave portion 97A with a width d2.

On the other hand, in the tire shown in FIG. 3, the foreground portion 93B is so provided that it is recessed from the surface of the sidewall portion 91B. Thus, when the foreground portion 93B indicates a character or characters, the foreground portion 93B itself becomes the narrow width concave portion and tends to suffer a crack or cracks. In addition, a part of a mold for forming the foreground portion 93B has to be protruded from a part of the mold corresponding to the sidewall, which makes a process of fabricating the mold more difficult and deteriorates a processing accuracy.

The present invention has made in view of these problems and its object is to provide a tire capable of suppressing a crack or cracks possibly occurring from a part of a decorative band and improving a visibility of marks formed on the decorative band.

Means for Solving the Problem

<1> According to the present invention, there is provided a tire having an endless decorative band on a surface of at least one of paired sidewalls, the decorative band having one or more first indicative sector and one or more second indicative sector which are arranged alternately and consecutively in the circumferential direction, wherein
the first indicative sector consists of a background portion which continuously leads to the sidewall portion adjacent to the first indicative sector with a uniform surface roughness value, and a foreground portion which is arranged in the background portion, has a maximum width in the radial direction of the tire identical with that of the background portion, and forms marks by having a surface roughness value larger than that of the background portion, and a background portion constituting a part or whole of the second indicative sector has a surface rougher than any of the sidewall portion and the background portion of the first indicative sector.

The "marks" as used herein includes a character, symbol, graphic and combination thereof. The "surface roughness value" or "surface roughness" as used in herein is defined as a Rz value measured according to JIS B 0601 within a range satisfying the following equations (1)-(3) by using a mean spacing Sm of convexes and concaves and a ten-point mean roughness Rz. The larger Rz means the rougher surface roughness value.

$$Sm(\text{mm}) \leq 3 \tag{1}$$

$$Rz(\mu m) \leq 3000 \tag{2}$$

$$Rz(\mu m)/Sm(\text{mm}) \leq 100 \tag{3}$$

According to this definition, the surface roughness value may be rougher by arranging protrusions which is so-called ridges on a smooth surface as well as by subjecting a smooth surface to sand or stain finishing.

<2> The present invention further provides the tire according to item <1>, wherein the maximum width in the radial direction of the first indicative sector is 0.9-1.1 times the maximum width in the radial direction of the second sector.

<3> The present invention further provides the tire according to item <1> or <2>, wherein the maximum width in the radial direction of the first indicative sector is the same as that of the second sector.

<4> The present invention further provides the tire according to any one of items <1> to <3>, wherein a proportion of the area of the foreground portion occupying in the first indicative sector is 65% or more and a proportion of the area of the background portion occupying in the second indicative sector is 40% or more.

<5> The present invention further provides the tire according to any one of items <1> to <4>, wherein ridges inclined with respect to the radial direction of the tire are aligned in the background portion of the second indicative sector to make the surface roughness value of the background portion rougher than that of the surrounding portions.

<6> The present invention further provides the tire according to any one of items <1> to <5>, wherein ridges inclined with respect to the radial direction of the tire are aligned in the foreground portion of the first indicative sector to make the surface roughness value of the foreground portion rougher than that of the background portion.

<7> The present invention further provides the tire according to item <6>, wherein tops of the ridges in the foreground portion of the first indicative sector are displaced at height positions recessed from the surface of the sidewall.

<8> The present invention further provides the tire according to item <6> or <7>, wherein the ridges in the foreground portion of the first indicative sector and the ridges of the background portion of the second indicative sector are identical in terms of an inclining angle with respect to the radial direction of the tire, a sectional shape and an arrangement pitch.

<9> The present invention further provides the tire according to any one of items <1> to <8>, wherein a foreground portion which forms the marks by having a surface roughness value smoother than that of the background portion is provided in the background portion of the second indicative sector.

<10> The present invention further provides the tire according to any one of items <1> to <9>, wherein a radially outside edge of the endless decorative band is within a range from (0.5D+0.6H) to (0.5D+0.8H) in the radial direction of the tire and a radially inside edge of the endless decorative band is within a range from (0.5D+0.15H) to (0.5D+0.45H) in the radial direction of the tire where D is a rim diameter of a corresponding rim and H is a section height of the tire.

Effect of the Invention

According to item <1>, the foreground portion of the first indicative sector is directly arranged in the background portion which continuously leads to the sidewall portion with a uniform surface roughness value, so that the marks can be distinguishable by enlarging the radial width of the marks formed by the difference of the surface roughness value between the foreground and background portions. Further, a narrow width concave portion is not formed between the sidewall and the foreground portion, which can prevent a tire failure caused by a crack or cracks from the narrow width concave portion.

While the endless indicative belt is a most distinguishable portion in appearance, the entire sector of the endless indicative band except the first indicative sector is the second indicative sector having the background portion of the roughness value rougher than that of the surface of the sidewall, so that, when an irregularity or a stain occurs on a portion in the endless decorative belt which does not involve in the formation of the principal marks, these the irregularity or stain can be less noticeable to improve an appearance performance of the tire.

According to item <2>, the maximum width in the radial direction of the first indicative sector is 0.9-1.1 times the maximum width in the radial direction of the second sector, so that the visibility of the decorative band can be enhanced. If the maximum width in the radial direction of the first indicative sector is less than 0.9 times the maximum width in the radial direction of the second sector, the radial width of the above-mentioned portion in the first indicative sector is not enough to obtain a good visibility. On the other hand, if it exceeds 1.1 times the maximum width in the radial direction of the second sector, the radial width of the second indicative sector becomes relatively too narrow and thus the visibility of the second indicative sector is decreased.

According to item <3>, the maximum width in the radial direction of the first indicative sector is the same as that of the second sector, so that the visibilities of these sectors can be enhanced in a best-balanced manner.

According to item <4>, a proportion of the area of the foreground portion occupying in the first indicative sector is 65% or more and a proportion of the area of the background portion occupying in the second indicative sector is 40% or more, so that the area of the portion having a larger surface roughness value is enlarged in the annular decorative belt to remarkably increase the effect of obscuring the irregularity or the stain occurred in a part of the endless decorative belt.

According to item <5>, ridges are aligned in the background portion of the second indicative sector to make the surface roughness value of the background portion rougher than that of the surrounding portions, so that as compared with the case that the surface is roughened by other means such as a corrosion process, the processing accuracy of the mold can be stabilized and the difference in the reflection of the lights between the background portion of the second indicative sector and its surrounding portions can be sharper to improve its designability.

In addition, the direction of the ridges is inclined with respect to the radial direction of the tire, so that it can prevent an effect of decreasing the visibility due to a smaller contrast between the portion with the ridges and the portion without ridges, which effect may occur if the direction of the ridges agrees with the radial direction and the marks which is usually so arranged that its lower side sits at the inner side in the radial direction of the tire are seen from the straight front, straight above or straight below.

According to item <6>, ridges inclined with respect to the radial direction of the tire are aligned in the foreground portion of the first indicative sector to make the surface roughness value of the foreground portion rougher than that of the background portion, so that, again in this case, as compared with the case that the surface is roughened by other means such as a corrosion process, the processing accuracy of the mold can be stabilized and the difference in the reflection of the lights between the background portion of the second indicative sector and its surrounding portions can be sharper to improve its designability.

According to item <7>, tops of the ridges in the foreground portion of the first indicative sector are displaced at height positions recessed from the surface of the sidewall, so that edges of portions of the mold corresponding to the ridges protrude from portions of the mold corresponding to the sidewall. Thus, the portions corresponding to the ridges can by easily fabricated, which results in an improved appearance of the tire.

According to item <8>, the ridges in the foreground portion of the first indicative sector and the ridges of the background portion of the second indicative sector are identical in terms of an inclining angle with respect to the radial direction of the tire, a sectional shape and an arrangement pitch, so that the fabrication of the mold can be simply configured and a workability of the mold is thus improved.

According to item <9>, a foreground portion which forms the marks by having a surface roughness value smoother than that of the background portion is provided in the background portion of the second indicative sector, so that while the decrease of the portion having a rough surface can be suppressed to prevent an unnecessary irregularity from being distinguished, the marks which is less important than the marks provided in the first indicative area but is still essential can be formed.

According to item <10>, the endless decorative belt is within the above-mentioned range, so that the marks can be formed in the sector having the best visibility.

BRIEF DESCRIPTION OF THE DRAWINGS

FIG. 1 shows a side view and a sectional view of a conventional tire;
FIG. 3 shows a side view and a sectional view of another conventional tire;
FIG. 5 shows partially side views of variations of the tire of the first embodiment;
FIG. 6 shows a side view and a sectional view of a variation tire of the first embodiment;
FIG. 9 shows a side view and a sectional view of a tire of a third embodiment.

Figure 2:
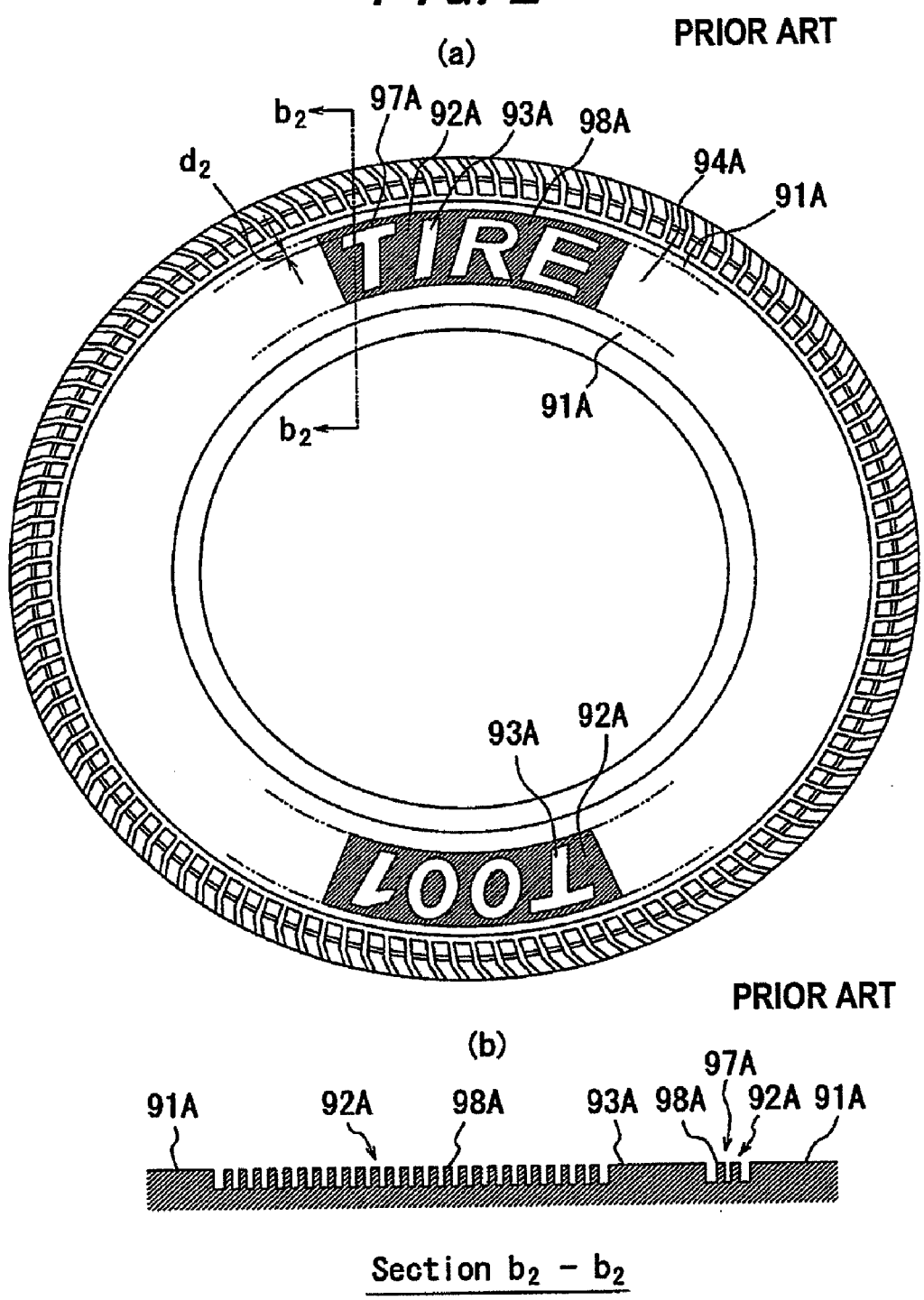
FIG. 2 shows a side view and a sectional view of another conventional tire.

DESCRIPTION OF SYMBOLS 1 sidewall
2 endless decorative band
3, 3B, 3C first indicative sector
4 second indicative sector
5, 5B, 5C background portion of the first indicative sector
6, 6B, 6C foreground portion of the first indicative sector
7 background portion of the second indicative sector
8 foreground portion of the second indicative sector
9 ridge
10 tire
11 sidewall
12 endless decorative band
14 second indicative sector
17 background portion of the second indicative sector
18 foreground portion of the second indicative sector
20 tire
21 sidewall
22 endless decorative band
23A, 23B first indicative sector
24A, 24B second indicative sector
25A, 25B background portion of the first indicative sector
26A, 26B foreground portion of the first indicative sector
27A, 27B background portion of the second indicative sector
28A foreground portion of the second indicative sector
29 ridge
30 tire
31 sidewall
32 endless decorative band
33A, 33B first indicative sector
34A, 34B second indicative sector
35A, 35B background portion of the first indicative sector
36A, 36B foreground portion of the first indicative sector
37A, 37B background portion of the second indicative sector
38A, 38B foreground portion of the second indicative sector
39 ridge
40 tire
41 sidewall
42 endless decorative band
43A, 43B, 43C first indicative sector
44A, 44B, 44C second indicative sector
45A, 45B, 45C background portion of the first indicative sector
46A, 46B, 46C foreground portion of the first indicative sector
47A, 47B, 47C background portion of the second indicative sector
49 ridge
50 tire

BEST MODE FOR CARRYING OUT THE INVENTION

Figure 4:
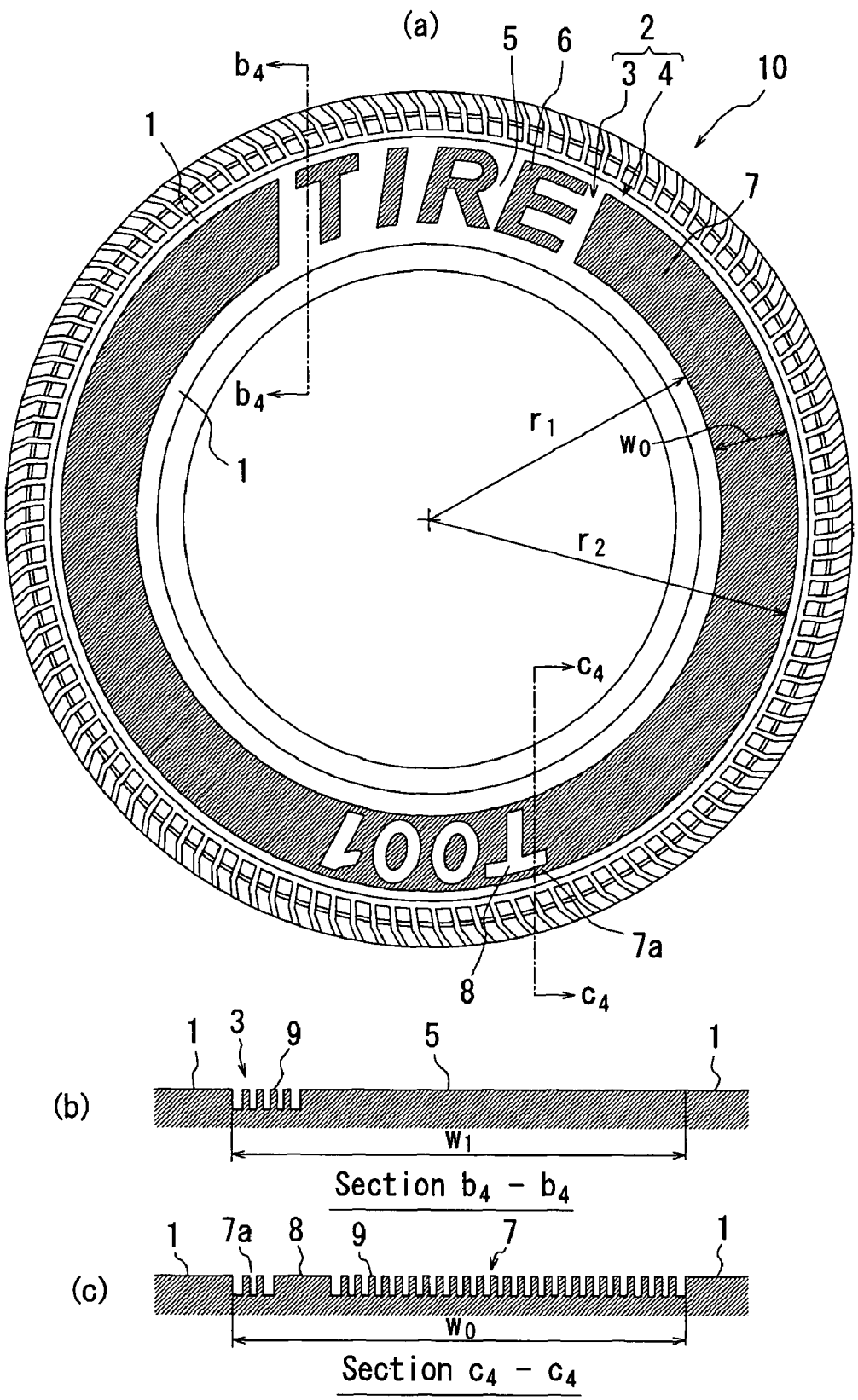
FIG. 4 shows a side view and a sectional view of a tire of a first embodiment.

Embodiments of the present invention will be described with reference to the drawings. FIG. 4($a$) is a side view of a tire of a first embodiment according to the present invention, FIG. 4($b$) is a sectional view as viewed along arrow $b_4$ in FIG. 4($a$), and FIG. 4($c$) is a sectional view as viewed along arrow $c_4$ in FIG. 4($a$). FIG. 5($a$) is an enlarged side view of a first indicative sector of this tire, and each of FIGS. 5($b$) and 5($c$) is an enlarged side view of a first indicative sector of a variation tire of this embodiment. A tire 10 is provided with an endless decorative band 2 extending around a central axis of the tire on a surface of at least one of sidewalls 1. The endless decorative belt 2 consists of one or more first indicative sector 3 and one or more second indicative sector 4 (in this figure, one of each), the first and second indicative sectors being arranged alternately in the circumferential direction. The first indicative sector 3 consists of a background portion 5 which continuously leads to the sidewall portion 1 adjacent to the first indicative sector 3 with a uniform surface roughness value, and a foreground portion 6 which forms marks with its surface roughness value larger than that of the background portion 5. A background portion 7 constituting whole or a part of the second indicative sector 4 has a surface rougher than any of the sidewall portion 1 and the background portion 5 of the first indicative sector 3.

As shown in FIG. 5($a$), a maximum radial width $a_1$ of the foreground portion 6 is identical with a maximum radial width $w_1$ of the background portion 5 in the first indicative sector 3. That is, the first indicative sector 3 is configured to have a shape containing the maximum width portion of the foreground portion 6.

The maximum radial width $w_1$ of the first indicative sector 3 defined by the above-mentioned manner is preferably 0.9-1.1 times, and more preferably identical with the maximum radial width $w_0$ of the second indicative sector. In relation to the maximum radial width of the first indicative sector and the maximum radial width $w_0$ of the second indicative sector 4, FIG. 5($a$) depicts a case where the maximum radial width $w_1$ of the first indicative sector 3 is identical with the maximum radial width $w_0$ of the second indicative sector 4 (i.e., $w_1 = w_0$), FIG. 5($b$) depicts a case where the maximum radial width $w_2$ of the first indicative sector is larger than the maximum radial width $w_0$ of the second indicative sector 4 (i.e., $w_2 > w_0$ (and $w_2 < 1.1 w_0$)), and FIG. 5($c$) depicts a case where the maximum radial width $w_3$ of the first indicative sector is smaller than the maximum radial width $w_0$ of the second indicative sector 4 (i.e., $w_3 > w_0$ (and $w_3 > 0.9w_0$)).

It is noted that the maximum widths of the foreground portions 6, 6B, 6C are still identical with the maximum widths of the first indicative sectors 3, 3B, 3C (i.e., the maximum widths of the background portions 5, 5B, 5C), respectively. For example, in the embodiments shown in FIGS. 5(b) and 5(c), the maximum widths $w_2$, $w_3$ of the background portion 5B, 5C, respectively, are designed to be equal to the maximum widths $a_2$, $a_3$ of the corresponding foreground portions 6B, 6C, respectively.

A position $r_1$ of a radially outside edge of the endless decorative band 2 is within a range from (0.5D+0.6H) to (0.5D+0.8H) in the radial direction of the tire and a position $r_2$ of a radially inside edge of the endless decorative band 2 is within a range from (0.5D+0.15H) to (0.5D+0.45H) in the radial direction of the tire, where D is a rim diameter of a corresponding rim and H is a section height of the tire. The sector defined by these edges is the best portion for the marks to be visibly recognized and thus the visibility of the marks is improved.

In the shown embodiment, the marks formed in the first indicative sector 3 by the difference of the surface roughness value between the foreground portion 5 and the background portion 6 are characters "TIRE". In addition to characters, the marks may be symbols, graphics or a combination thereof.

In particular, when the maximum radial width $w_1$ of the foreground portion 6 is identical with the maximum radial width $w_0$ of the second indicative sector 4, the marks can be arranged to be as much as the width of the endless decorative band 2. As a result, the visibility of the marks can be further improved.

In this case, the background portion 5 continuously leads to the sidewall portions 1 adjacent inwardly and outwardly to the endless decorative band 2 with a uniform surface roughness value, so that a crack does not occur between the sidewall portion 1 and the foreground portion 6.

Moreover, the sector of the endless indicative band 2 except the first indicative sector 3 is composed of the second indicative sector 4 having the background portion 7 of the roughness value rougher than that of the surface of the sidewall 1, so that, when an irregularity or a stain occurs on a portion in the endless decorative belt which does not involve in the formation of the principal marks, these irregularity or stain can be less noticeable to improve an appearance performance of the tire.

As described above, according to the present invention, the principal marks, which is desired to be distinguished, can be made distinguishable as desired while the irregularity and stain, which is desired to be less noticed, can be made less noticeable as desired.

The tire 10 is so configured that a proportion of the area of the foreground portion 6 occupying in the first indicative sector 3 is 65% or more and a proportion of the area of the background portion 7 occupying in the second indicative sector 4 is 40% or more. Therefore, the irregularity or the stain can be further effectively prevented from be identified.

As a means for making the foreground portion 6 of the first indicative sector 3 and the background portion 7 of the second indicative sector 4 rougher than the surface of the sidewall 1, a mold may be subjected to a surface treatment such as a blast finishing to roughen the surface of the tire corresponding to the treated surface of the mold. Alternatively and preferably, ridges (protrusions) 9 inclined with respect to the radial direction of the tire are aligned to roughen the surface, as is the case of the shown embodiment. In this case, it is possible to maintain a finishing state of the surface of the mold at high accuracy, and to enlarge a contrast due to the difference in reflection between the surface provided with the ridges 9 and the other surface adjacent thereto in the tire.

Further, when the ridges 9 are provided on both of the foreground portion 6 of the first indicative sector 3 and the background portion 7 of the second indicative sector 4, inclining angles with respect to the radial direction of the tire, sectional shapes and arrangement pitches are preferably identical between the ridges of these portions. As a result, the mold can be fabricated with a simple process.

Tops of the ridges 9 in the foreground portion 6 of the first indicative sector 3 are preferably displaced at height positions recessed from the surface of the sidewall 1. In this case, as mentioned above, the edges of the ridges 9 can be formed sharply.

A foreground portion 8 having a roughness value smoother than that of the background portion 7 of the second indicative sector 4 may be provided in the background portion 7 and marks whose priority lower than that of the marks formed in the first indicative sector 3 may be arranged in this foreground portion. This is because the maximum radial width of the foreground portion 8 has to be small in order to prevent the background portion 7a forming between the foreground portion 8 and the sidewall 1 from being narrow in the width. In addition, the second indicative sector 4 is a portion of the decorative band 2 for mainly obscuring an irregularity and a stain so that the smaller area of the foreground portion 8 is the better.

FIG. 6(a) is a side view of a variation tire of the first embodiment, FIG. 6(b) is a sectional view as viewed along arrow $b_3$ in FIG. 6(a), and FIG. 6(c) is a sectional view as viewed along arrow $c_3$ in FIG. 6(a). The variation tire 20 has an endless decorative band 12 extending around the central axis of the tire on a surface of at least one of sidewalls 1. The endless decorative belt 12 consists of a first indicative sector 13 and a second indicative sector 14, the first and second indicative sectors being arranged alternately in the circumferential direction. The first indicative sector 13 of the tire 20 is configured in the exactly same manner as the first indicative sector 3 of the first embodiment of the tire, and the tire 20 is similar to the tire 10 except that the foreground portion 18 of the tire 20 arranged in the background portion 17 of the second indicative sector 14 has a position and size different from those of the foreground portion 8 of the tire 10 in terms of design. The characteristics which each portion of the endless decorative band 12 should have is identical with those described for the tire 10 of the first embodiment.

Figure 7:
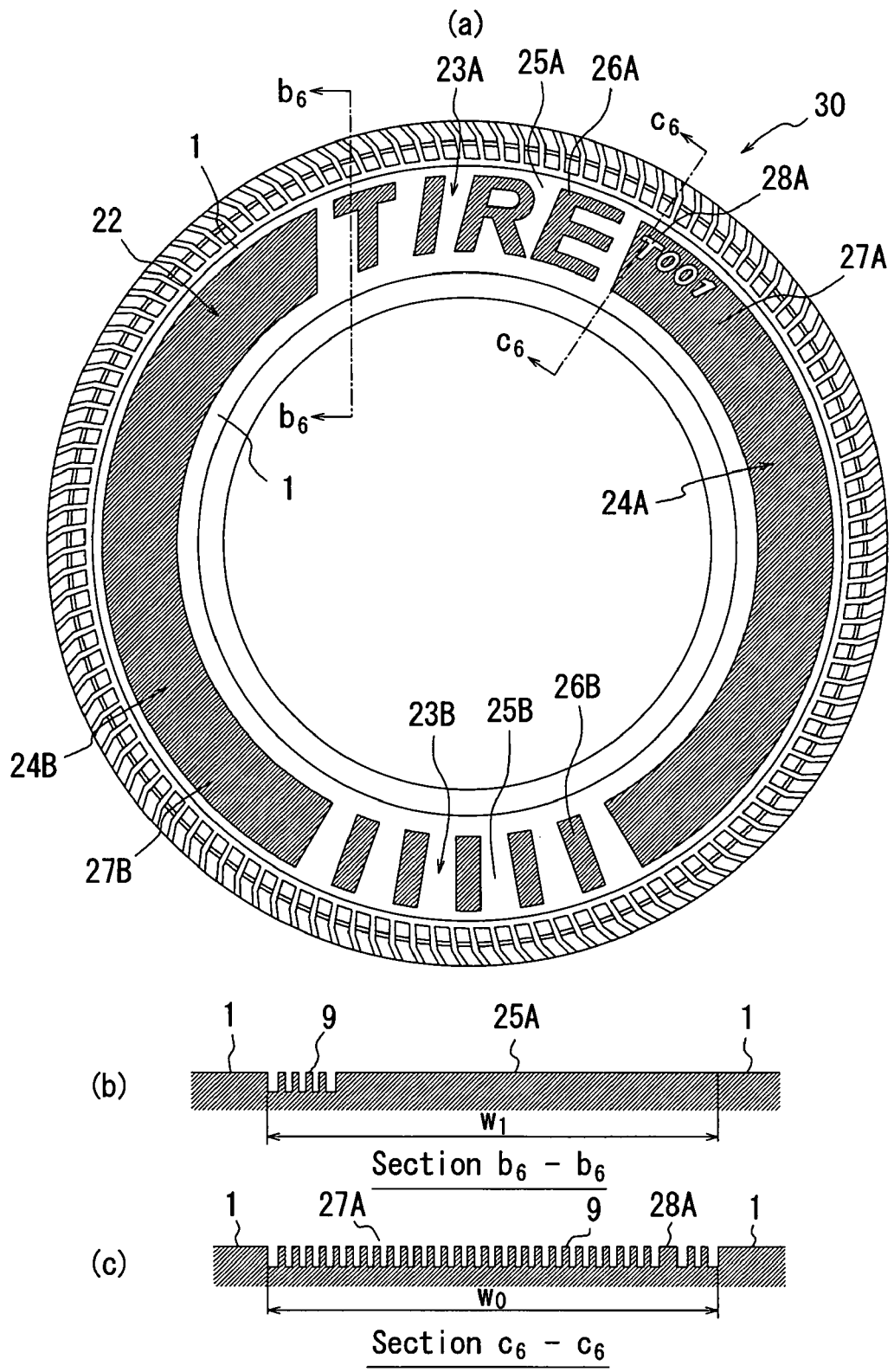
FIG. 7 shows a side view and a sectional view of a tire of a second embodiment.

FIG. 7(a) is a side view of a tire of the second embodiment, FIG. 7(b) is a sectional view as viewed along arrow $b_3$ in FIG. 7(a), and FIG. 7(c) is a sectional view as viewed along arrow $c_3$ in FIG. 7(a). The tire 30 has an endless decorative band 22 extending around the central axis of the tire on a surface of at least one of sidewalls 1. The endless decorative belt 22 consists of two first indicative sectors 23A, 23B and two second indicative sectors 24A, 24B, the first and second indicative sectors being arranged alternately in the circumferential direction. The first indicative sector 23A (or 23B) consists of a background portion 25A (or 25B) which continuously leads to the sidewall portion 1 adjacent to the first indicative sector with a uniform surface roughness value, and a foreground portion 26A (or 26B) which forms marks by having a surface roughness value larger than that of the background portion 25A (or 25B), and a background portion 27A (or 27B) constituting a part of the second indicative sector 24A (or a part of the second indicative sector 24B) has a surface rougher than any of the sidewall portion 1 adjacent thereto and the background portion 25A (or 25B) of the first indicative sector 23A (or 23B).

In addition, in the first indicative sector 23A (or 23B), the maximum radial width of the foreground portion 26A (or 26B) is identical with the maximum radial width $w_1$ of the background portion 25A (or 25B). That is, the first indicative sector 23A (or 23B) is defined to have a shape containing the maximum width portion of the foreground portion 26A (or 26B).

The maximum radial width $w_1$ of the first indicative sector 23A (or 23B) defined by the above-mentioned manner is preferably 0.9-0.11 times and more preferably identical with the maximum radial width $w_0$ of the second indicative area 24A (or 24B).

Here, the tire 30 of the second embodiment is different from the tire 10 of the first embodiment in the point that it has not one but two of each of the alternately arranged first indicative sector 23A or 23B and second indicative sector 24A or 24B. The tire of this embodiment, however, can achieve the same effect as that of the tire 10 of the first embodiment.

In the tire 30, marks indicating characters "TIRE" are formed on the first indicative sectors 23A and marks indicating symbols is formed on the other first indicative sector 23B. Both of the foreground portions 26A and 26B forming these marks are preferably arranged to extend extensively over the radial width of the endless decorative band 22, so that the visibility of the marks can be improved.

In the second indicative sector 24A, the foreground portion 28A is arranged in the background portion 27A of the surface roughness value larger than that of the sidewall 1 by means of the ridges to form marks indicating characters "T001". The other second indicative sector 24B is composed only of the background portion 27A formed by aligning the ridges 9, so that minimum required marks are formed. At the same time, the area of the portion having a rough surface is increased, so that when an irregularity or a stain occurs on the surface, these irregularity and a stain may get less noticeable.

Figure 8:
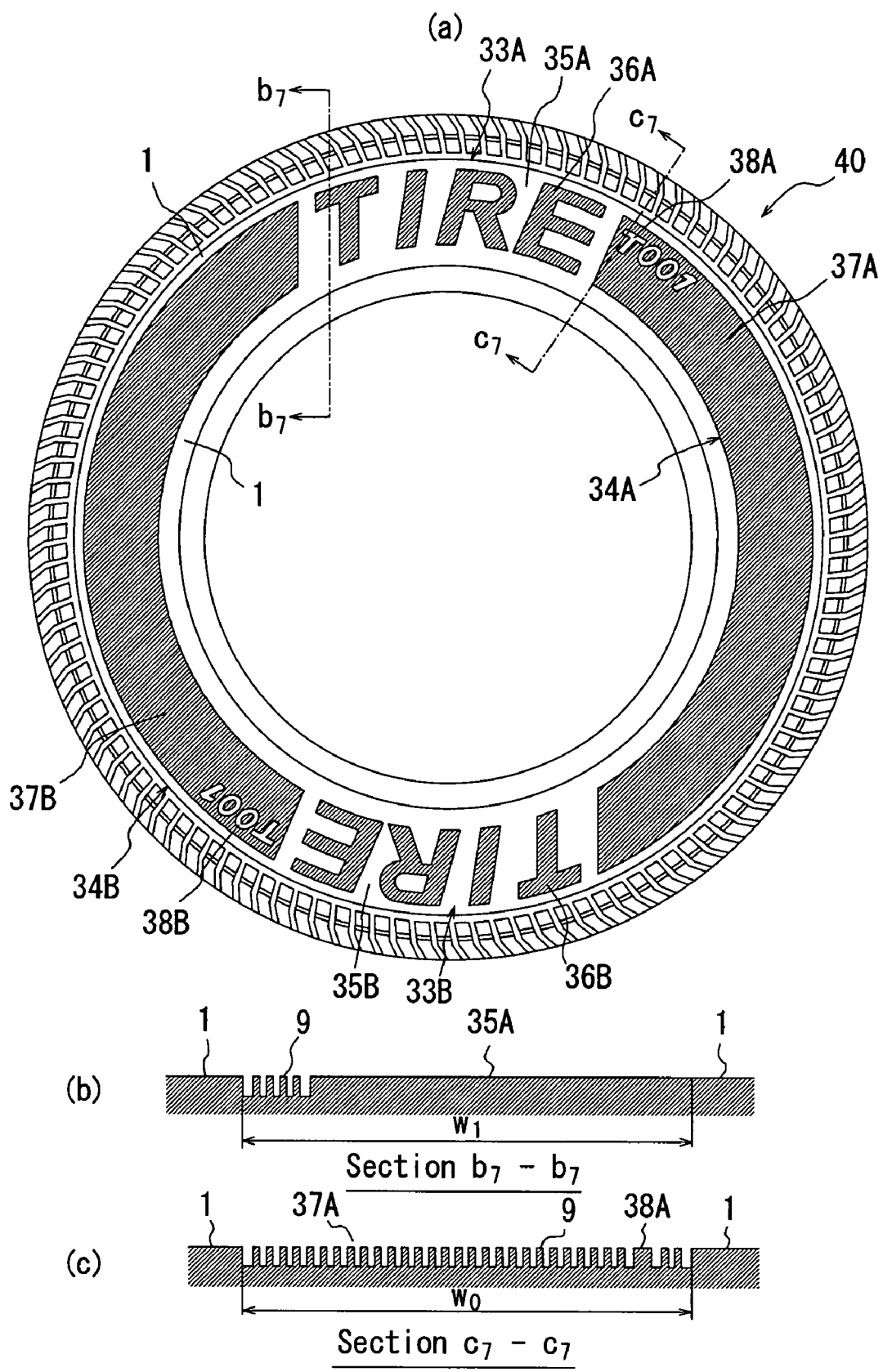
FIG. 8 shows a side view and a sectional view of a variation tire of the second embodiment.

FIG. 8(*a*) is a side view of a variation tire of the second embodiment, FIG. 8(*b*) is a sectional view as viewed along arrow $b_3$ in FIG. 8(*a*), and FIG. 8(*c*) is a sectional view as viewed along arrow $c_3$ in FIG. 8(*a*). The variation tire 40 has an endless decorative band 32 extending around the central axis of the tire on a surface of at least one of sidewalls 1. The endless decorative belt 32 consists of first indicative sectors 33A, 33B and second indicative sectors 34A, 34B, the first and second indicative sectors being arranged alternately in the circumferential direction.

In a comparison between the variation tire 40 and the tire 30 of the second embodiment, the first indicative sector 33A and the second indicative sector 34A are identical or substantially identical with the first indicative sector 23A and the second indicative sector 24A, respectively, corresponding in the tire 30. On the other hand, the first indicative sector 33B and the second indicative sector 34B are different from those corresponding in the tire 30 in the point that the marks indicating not the symbols but the characters "TIRE" and the marks indicating the character "T001". Besides these designs, these tires have no difference in terms of basic configurations, so that the tire 40 can achieve the same effect as mentioned above for the tire 30.

FIG. 9(*a*) is a side view of a tire of the third embodiment, FIG. 9(*b*) is a sectional view as viewed along arrow $b_3$ in FIG. 9(*a*), and FIG. 9(*c*) is a sectional view as viewed along arrow $c_3$ in FIG. 9(*a*). The tire 50 has an endless decorative band 42 extending around the central axis of the tire on a surface of at least one of sidewalls 1. The endless decorative belt 42 consists of three first indicative sectors 43A, 43B, 43C and three second indicative sectors 44A, 44B, 44C, the first and second indicative sectors being arranged alternately in the circumferential direction. The first indicative sector 43A (or 43B or 43C) consists of a background portion 45A (or 45B or 45C) which continuously leads to the sidewall portion 1 adjacent to the first indicative sector with a uniform surface roughness value, and a foreground portion 46A (or 46B or 46C) which forms marks by having a surface roughness value larger than that of the background portion 45A (or 45B or 45B), and a background portion 47A (or 47B or 47C) constituting a whole of the second indicative sector 44A (or 44B or 44C) has a surface rougher than any of the sidewall portion 1 adjacent thereto and the background portion 45A (or 45B or 45C) of the first indicative sector 43A (or 43B or 43C).

Moreover, the maximum radial width $w_1$ of the foreground portion 46A (or 46B or 46C) of the first indicative sector 43A (or 43B or 43C) is preferably 0.9-0.11 times and more preferably identical with the maximum radial width $w_0$ of the second indicative area 44A (or 44B or 44C).

Here, the tire 50 of the third embodiment is different from the tire 30 of the second embodiment in the point that it has not two but three of each of the alternately and circumferentially arranged first and second indicative sector 43A, 43B or 43C and 44A, 44B or 44C. In the tire 50, however, the characters "TIRE" which is main marks, characters "TEXT" and characters "0001" are arranged entirely over the with of the endless decorative band to improve its visibility, and these tires 30 and 50 are not significantly different from each other in the point of their basic configurations and effects.

INDUSTRIAL APPLICABILITY

The present invention can be applied to any kind of tires which have a sidewall.

The invention claimed is:

1. A tire having an endless decorative band on a surface of at least one of paired sidewalls, the decorative band having one or more first indicative sector and one or more second indicative sector which are arranged alternately and consecutively in the circumferential direction, wherein
the first indicative sector consists of a background portion which continuously leads to the sidewall portion adjacent to the first indicative sector with a uniform surface roughness value, and a foreground portion which is arranged in the background portion, has a maximum width in the radial direction of the tire identical with that of the background portion, and forms marks by having a surface roughness value larger than that of the background portion, and
a background portion constituting a part or a whole of the second indicative sector continuously leads to the sidewall portion adjacent to the second indicative sector and has a surface rougher than any of the sidewall portion adjacent to the first indicative sector, the sidewall portion adjacent to the second indicative sector, and the background portion of the first indicative sector, the radially inside edge of the decorative band having a constant radial height.

2. The tire according to claim 1, wherein the maximum width in the radial direction of the first indicative sector is 0.9-1.1 times the maximum width in the radial direction of the second sector.

3. The tire according to claim 1, wherein the maximum width in the radial direction of the first indicative sector is the same as that of the second sector.

4. The tire according to claim 1, wherein a proportion of the area of the foreground portion occupying in the first indicative sector is 65% or more and a proportion of the area of the background portion occupying in the second indicative sector is 40% or more.

5. The tire according to claim 4, wherein the ridges in the foreground portion of the first indicative sector and the ridges of the background portion of the second indicative sector are identical in terms of an inclining angle with respect to the radial direction of the tire, a sectional shape and an arrangement pitch.

6. The tire according to claim 1, wherein ridges inclined with respect to the radial direction of the tire are aligned in the background portion of the second indicative sector to make the surface roughness value of the background portion rougher than that of the surrounding portions.

7. The tire according to claim 1, wherein ridges inclined with respect to the radial direction of the tire are aligned in the foreground portion of the first indicative sector to make the surface roughness value of the foreground portion rougher than that of the background portion.

8. The tire according to claim 7, wherein tops of the ridges in the foreground portion of the first indicative sector are displaced at height positions recessed from the surface of the sidewall.

9. The tire according to claim 1, wherein a foreground portion which forms the marks by having a surface roughness value smoother than that of the background portion is provided in the background portion of the second indicative sector.

10. The tire according to claim 1, wherein a radially outside edge of the endless decorative band is within a range from (0.5D+0.6H) to (0.5D+0.8H) in the radial direction of the tire and a radially inside edge of the endless decorative band is within a range from (0.5D+0.15H) to (0.5D+0.45H) in the radial direction of the tire where D is a rim diameter of a corresponding rim and H is a section height of the tire.

* * * * *